United States Patent
Misra et al.

(10) Patent No.: US 10,031,839 B2
(45) Date of Patent: Jul. 24, 2018

(54) CONSTRAINT EXTRACTION FROM NATURAL LANGUAGE TEXT FOR TEST DATA GENERATION

(71) Applicant: Accenture Global Solutions Limited, Dublin (IE)

(72) Inventors: Janardan Misra, Bangalore (IN); Milind Savagaonkar, Bangalore (IN); Neville Dubash, Mumbai (IN); Sanjay Podder, Thane (IN); Sachin Hanumantappa Waddar, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 14/990,051

(22) Filed: Jan. 7, 2016

(65) Prior Publication Data
US 2017/0132115 A1    May 11, 2017

(30) Foreign Application Priority Data
Nov. 10, 2015   (IN) .......................... 6071/CHE/2015

(51) Int. Cl.
*G06F 9/44*   (2018.01)
*G06F 11/36*   (2006.01)
*G06F 17/27*   (2006.01)

(52) U.S. Cl.
CPC ...... *G06F 11/3668* (2013.01); *G06F 17/2705* (2013.01); *G06F 17/2765* (2013.01)

(58) Field of Classification Search
CPC ............. G06F 11/3672; G06F 11/3676; G06F 11/3684; G06F 8/10
See application file for complete search history.

(56) References Cited

U.S. PATENT DOCUMENTS

| | | | | |
|---|---|---|---|---|
| 7,353,248 | B1* | 4/2008 | Kirkpatrick | H04L 67/2819 707/999.1 |
| 2004/0260516 | A1* | 12/2004 | Czerwonka | G06F 11/3684 702/186 |
| 2005/0066263 | A1* | 3/2005 | Baugher | G06Q 20/40 715/205 |
| 2006/0010426 | A1* | 1/2006 | Lewis | G06F 11/3684 717/124 |

(Continued)

OTHER PUBLICATIONS

Liang et al., "A Pattern Matching and Clustering Based Approach for Supporting Requirements Transformation", Proceedings of the First International Conference on Requirements Engineering, (1994), pp. 180-183.

*Primary Examiner* — Duy Khuong T Nguyen
(74) *Attorney, Agent, or Firm* — Harrity & Harrity, LLP

(57) ABSTRACT

A device may obtain text to be processed to extract constraints corresponding to an object in the text. The constraints may define values permitted to be associated with the object. The device may extract the constraints based on identifying patterns in the text. The device may generate, based on the constraints, positive test data and negative test data for testing values for the object. The positive test data may include a first value that satisfies each of the constraints, and the negative test data may include a second value that violates at least one of the constraints. The device may provide information that identifies the positive test data and the negative test data.

20 Claims, 10 Drawing Sheets

(56) References Cited

U.S. PATENT DOCUMENTS

| | | | | |
|---|---|---|---|---|
| 2012/0272206 | A1* | 10/2012 | Sengupta | G06F 17/2705 717/101 |
| 2013/0263089 | A1 | 10/2013 | Banerjee et al. | |
| 2014/0007056 | A1* | 1/2014 | Leizerovich | G06F 17/30533 717/124 |
| 2014/0026125 | A1* | 1/2014 | Pasala | G06F 11/3684 717/126 |
| 2014/0115437 | A1 | 4/2014 | Bhatt et al. | |
| 2015/0178625 | A1* | 6/2015 | Berlandier | G06Q 10/0637 706/11 |
| 2015/0301927 | A1* | 10/2015 | Pasala | G06F 11/3684 714/38.1 |

* cited by examiner

Constraint Extraction and Test Data Generation Application

Generated Test Data

| Test Data | Test Data Type | Comments |
|---|---|---|
| 24000 | Positive | |
| 19999 | Negative | Numeric Value is less than 20000 |
| 25001 | Negative | Numeric Value is greater than 25000 |
| 1000 | Negative | String Length is less than five digits / Numeric Value is less than 20000 |

Tested Existing Test Data

| Test Data | Test Data Type | Validated | Comments |
|---|---|---|---|
| 24589 | Positive | Yes | |
| 19678 | Negative | No | Numeric Value is less than 20000 |
| 28999 | Negative | Yes | Numeric Value is greater than 25000 |
| 2300 | Negative | Yes | String Length is less than five digits / Numeric Value is less than 20000 |

FIG. 7C

CONSTRAINT EXTRACTION FROM NATURAL LANGUAGE TEXT FOR TEST DATA GENERATION

RELATED APPLICATION

This application claims priority under 35 U.S.C. § 119 to Indian Patent Application No. 6071/CHE/2015, filed on Nov. 10, 2015, the content of which is incorporated by reference herein in its entirety.

BACKGROUND

Test data generation may include creating sets of data for testing the accuracy of a new or revised software application. During software development, a software engineer may design a software application based on provided requirements. The requirements may indicate particular values that are permitted or are not permitted to be associated with an object that is being modelled. The developer may utilize test data to determine whether the software application accurately implements the requirements.

SUMMARY

In some possible implementations, a device may include one or more processors. The one or more processors may obtain text to be processed to extract constraints corresponding to an object in the text. The constraints may define values permitted to be associated with the object. The one or more processors may extract the constraints based on identifying patterns in the text. The patterns may include a relational operator and a numeric value. The one or more processors may generate positive test data and negative test data, based on the constraints, for testing values for the object. The positive test data may include a first value that satisfies each of the constraints. The negative test data may include a second value that violates at least one of the constraints. The one or more processors may provide information that identifies the positive test data and the negative test data.

In some possible implementations, a non-transitory computer readable medium may store instructions. The instructions may cause a processor to obtain text to be processed to extract a constraint corresponding to an object in the text. The constraint may define values permitted to be associated with the object. The instructions may cause the processor to extract the constraint based on identifying a pattern in the text. The instructions may cause the processor to generate, based on the constraint, positive test data and negative test data for testing values for the object. The positive test data may include a first value that satisfies the constraint. The negative test data may include a second value that violates the constraint. The instructions may cause the processor to provide information that identifies the positive test data and the negative test data.

In some possible implementations, a method may include obtaining, by a device, text to be processed to extract constraints corresponding to an object in the text. The constraints may define values permitted to be associated with the object. The method may include extracting, by the device, the constraints based on identifying patterns in the text. The method may include generating, by the device and based on the constraints, positive test data and negative test data for testing values for the object. The positive test data may include a first value that satisfies each of the constraints. The negative test data may include a second value that violates at least one of the constraints. The method may include providing, by the device, information that identifies the positive test data and the negative test data.

BRIEF DESCRIPTION OF THE DRAWINGS

FIGS. 7A-7C are diagrams of an example implementation relating to the example process shown in FIG. 6.

DETAILED DESCRIPTION

The following detailed description of example implementations refers to the accompanying drawings. The same reference numbers in different drawings may identify the same or similar elements.

A corpus of text may include information that identifies constraints for objects described in the text. The constraints may define one or more conditions associated with an object. For example, a requirements document for a software application may include one or more constraints associated with an object, which may define values that are permitted or are not permitted to be associated with the object (e.g., in order for the software to operate correctly). As an example, a password object may require a particular combination of letters, numbers, and special characters. The requirements document may include, for example, a set of interrelated constraints associated with the object, such as a numeric constraint, a string length constraint, a string constituent constraint (e.g., that specifies a character, a type of character, a substring, etc. that is to be included in a string), or the like. Further, constraints defining the same condition may be expressed in multiple ways, and/or a set of constraints may define conflicting conditions.

A user, such as a software engineer, may need to analyze the constraints to develop and/or design a system (e.g., a hardware system, a software application executing on a hardware system, etc.) from the requirements document. This may require the user to infer constraints from the requirements document, determine the consistency of the constraints, and generate test data for testing the constraints. Implementations described herein may assist the user in extracting constraints from natural language text, and may assist in generating test data satisfying and/or violating each possible combination of constraints. Further, implementations described herein may assist the user in validating existing test data. Implementations described herein may automate constraint extraction and test data generation, which may reduce the time and manual effort needed during a software design phase. Further, implementations described herein may result in more accurate constraint extraction and test data generation, which may reduce the processing resources needed during software development and design, and which may reduce errors in software development and design. Further, implementations described herein may improve software accuracy, which may reduce software errors and/or flaws, may reduce security issues, may conserve processing resources, etc.

Figure 1:
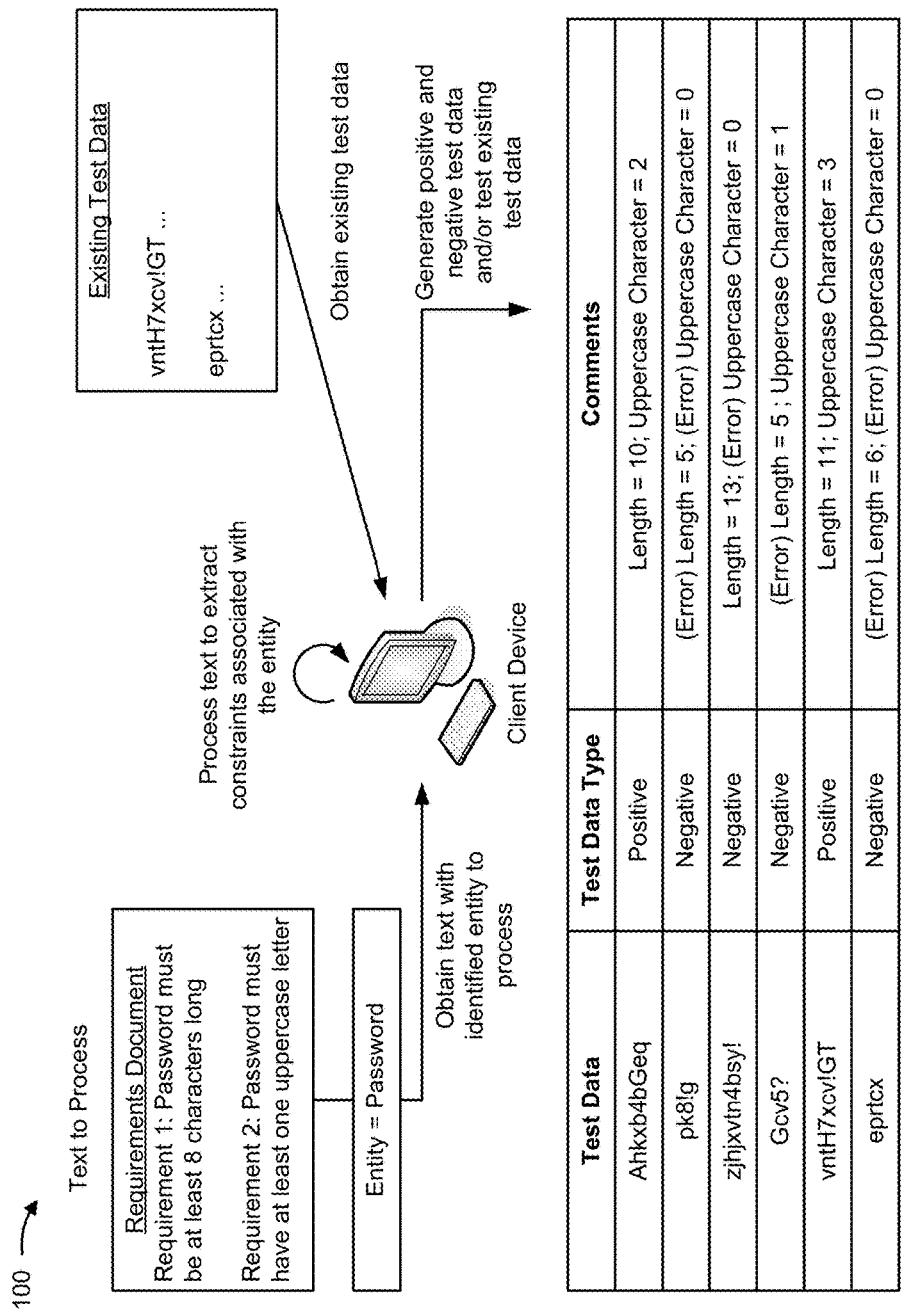
FIG. 1 is a diagram of an overview of an example implementation described herein.

FIG. 1 is a diagram of an overview of an example implementation 100 described herein. As shown in FIG. 1, a client device (e.g., a desktop computer, a laptop computer, etc.) may obtain text to be processed to extract constraints associated with an object in the text. For example, assume that the text is a requirements document that includes the requirements "Password must be at least 8 characters long," and "Password must have at least one uppercase letter," as shown. As further shown, the client device may obtain information indicating that the object is "Password." An object may include a concept that is being modelled (e.g., during a software design phase), and that may be capable of being associated with a particular value or a set of values (e.g., an integer value, a floating point value, a string length value, etc.). A constraint may define values that are permitted to and/or that are not permitted to be associated with the object. Further, values that are permitted to be associated with the object may constitute positive test data, whereas values that are not permitted to be associated with the object may constitute negative test data, for example.

As further shown in FIG. 1, the client device may process the text to extract constraints associated with the object, and may generate positive and negative test data based on the extracted constraints. For example, the client device may analyze the constraints, and may generate positive and negative test data that may be used to test a system that was designed using the requirements in the requirements document. Constraint extraction techniques and test data generation techniques are described in more detail elsewhere herein. As further shown, the client device may obtain existing test data, and may test the existing data using the extracted constraints.

As shown, the client device may provide (e.g., for display) information that identifies generated test data, a test data type that indicates whether the generated test data is positive test data or negative test data, and comments that indicate whether all, some, or none of the constraints were satisfied. In this way, the client device may assist in extracting constraints associated with objects in text, which may reduce processing time for constraint extraction, may result in more accurate constraint extraction, or the like. Further, the client device may assist in generating test data based on the constraints and may assist in validating existing data, which may reduce processing time and processing resources for test data generation, may result in more accurate system development, may result in fewer errors associated with a developed system, or the like.

Figure 2:
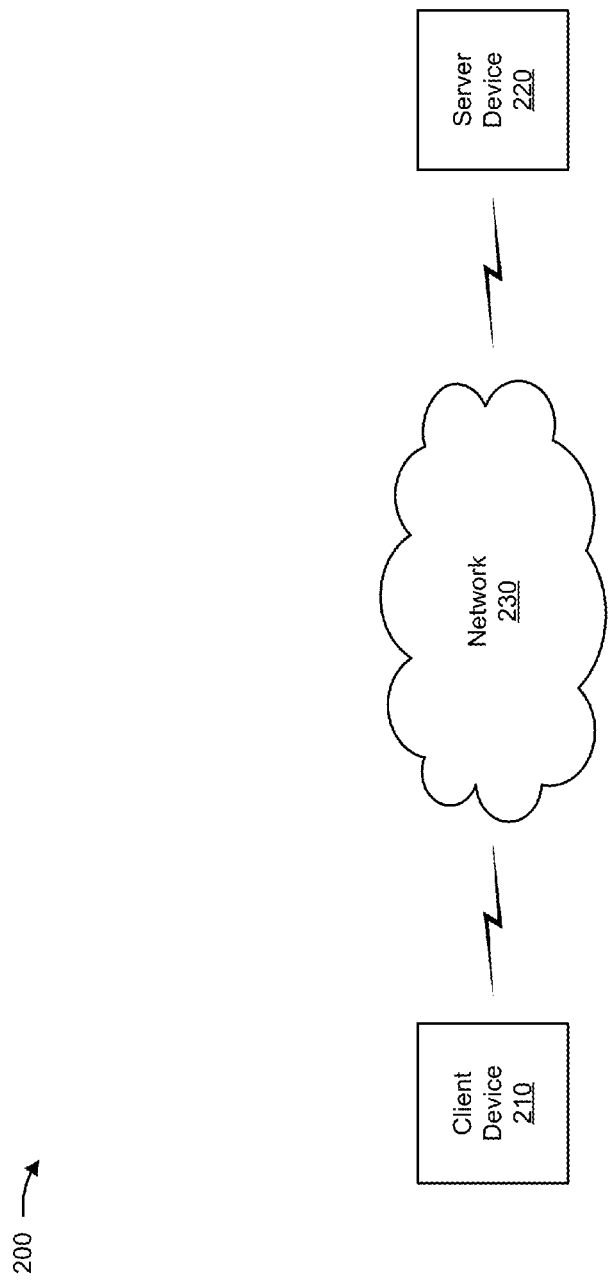
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a server device 220, and a network 230. Devices of environment 200 may interconnect via wired connections, wireless connections, or a combination of wired and wireless connections.

Client device 210 may include one or more devices capable of receiving, generating, storing, processing, and/or providing information associated with text (e.g., a word included in the text, a tag for a word included in the text, a constraint, a constraint extraction technique, test data, etc.). For example, client device 210 may include a computing device, such as a desktop computer, a laptop computer, a tablet computer, a server device, a mobile phone (e.g., a smart phone, a radiotelephone, etc.), or a similar type of device.

Server device 220 may include one or more devices, such as one or more server devices, capable of storing, processing, and/or providing text and/or information associated with text. In some implementations, server device 220 may receive, from client device 210, and/or may provide, to client device 210, information associated with text (e.g., a word included in the text, a tag for a word included in the text, a constraint, a constraint extraction technique, test data, etc.). In some implementations, server device 220 may perform one or more functions described herein as being performed by client device 210. Additionally, or alternatively, client device 210 may perform one or more functions described herein as being performed by server device 220.

Network 230 may include one or more wired and/or wireless networks. For example, network 230 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
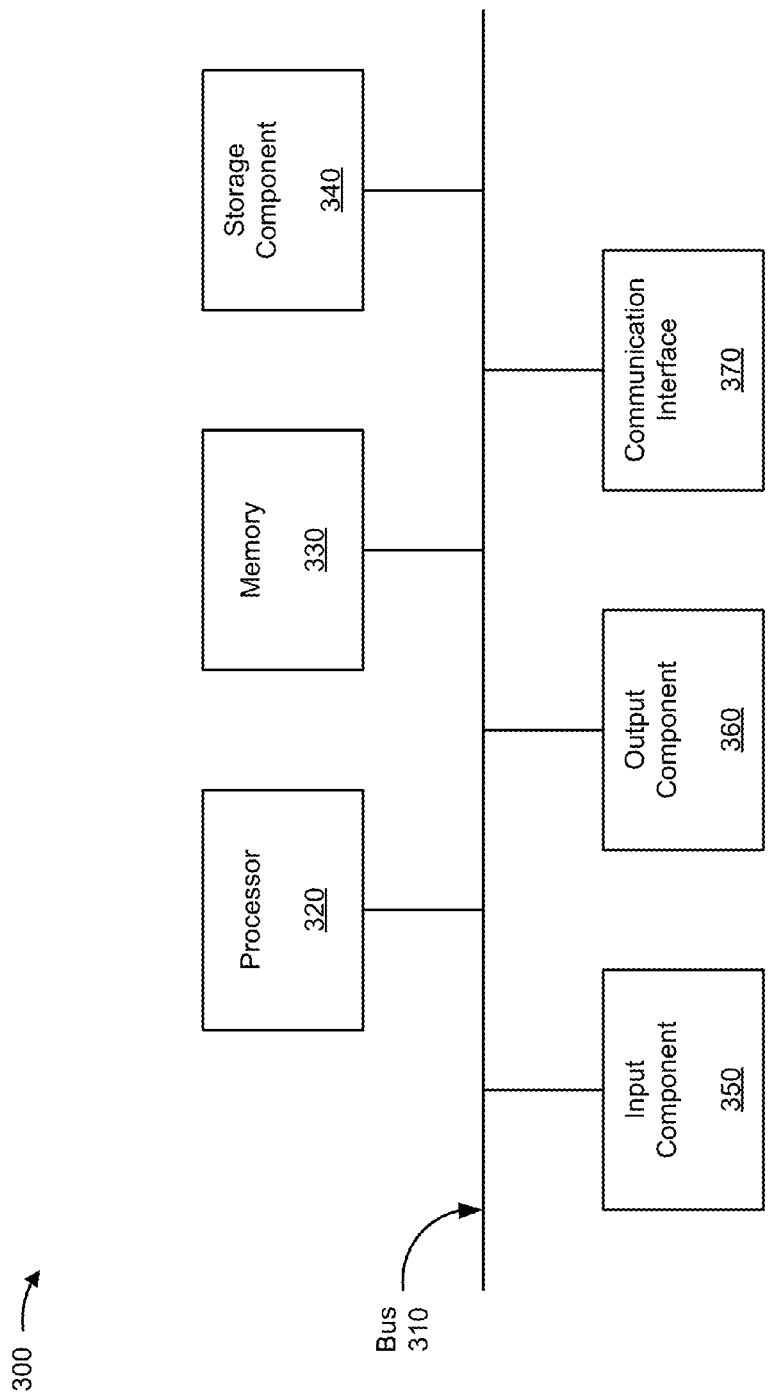
FIG. 3 is a diagram of example components of one or more devices of FIG. 2.

FIG. 3 is a diagram of example components of a device 300. Device 300 may correspond to client device 210 and/or server device 220. In some implementations, client device 210 and/or server device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors that can be programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
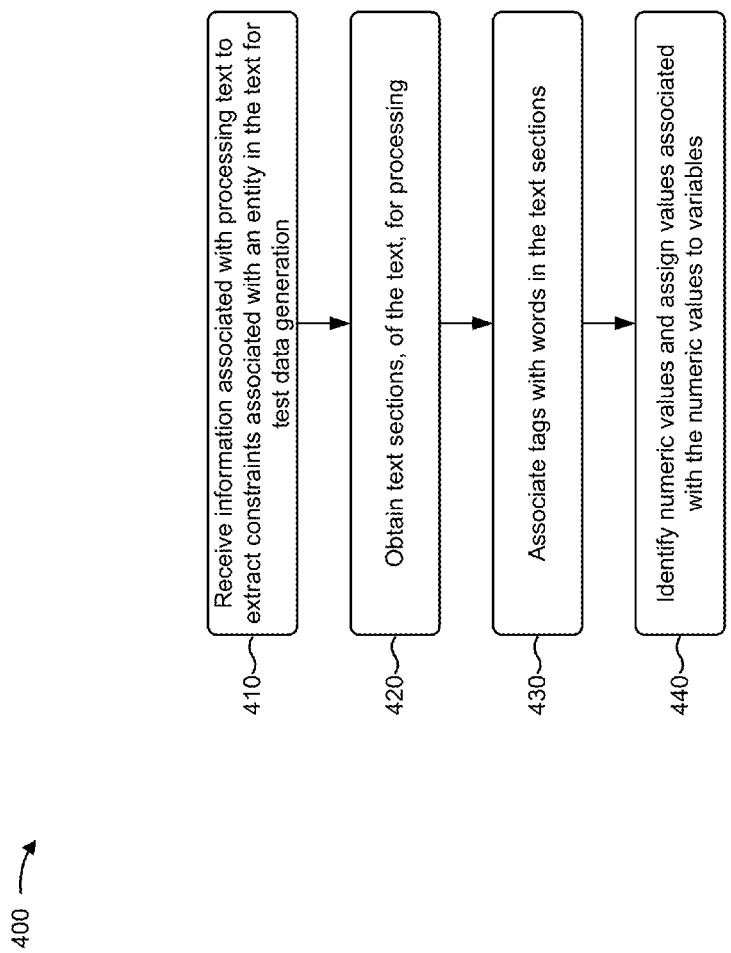
FIG. 4 is a flow chart of an example process for preparing text for processing to extract constraints associated with an object in the text for test data generation.

FIG. 4 is a flow chart of an example process 400 for preparing text for processing to extract constraints associated with an object in the text for test data generation. In some implementations, one or more process blocks of FIG. 4 may be performed by client device 210. In some implementations, one or more process blocks of FIG. 4 may be performed by another device or a group of devices separate from or including client device 210, such as server device 220.

As shown in FIG. 4, process 400 may include receiving information associated with processing text to extract constraints associated with an object in the text for test data generation (block 410). For example, client device 210 may receive information that identifies text to be processed, may receive information that identifies constraint extraction techniques to be used to extract constraints in the text, may receive information that identifies words in the text, may receive information that identifies a word representing an object in the text, may receive information associated with a technique to be used to identify words in the text, or the like.

In some implementations, client device 210 may receive, via input from a user and/or another device, information that identifies text to be processed. For example, a user may input (e.g., via a user interface of client device 210) text to be processed. Additionally, or alternatively, a user may input information identifying the text or a memory location at which the text is stored (e.g., local to and/or remote from client device 210). The text may include, for example, a document that includes text (e.g., a text file, a text document, a file that includes text and other information, such as images, etc.), a group of documents that include text (e.g., multiple files), a section of a document that includes text (e.g., a section indicated by a user, a section identified by document metadata, etc.) and/or other information that includes text. In some implementations, client device 210 may receive an indication of one or more sections of text to be processed.

In some implementations, the text may include one or more objects. For example, an object may refer to a concept that is being modelled (e.g., during a software development design phase), and may be identified using one or more words in the text (e.g., an object term). Additionally, or alternatively, the text may include one or more requirements corresponding to an object. An object may be capable of being associated with a particular value or a set of values (e.g., an integer value, a floating point value, a string length value, etc.), and may be represented as an integer, a character, a character string, or the like. For example, assume an object is "Password." A requirements document may include one or more requirements to be implemented during the modelling of the object (e.g., "Password"). For example, the requirements document may include the requirements that "Password must be at least five characters long," and that "Password must contain at least one uppercase letter."

The requirements may relate to one or more constraints associated with an object. For example, a constraint may define one or more conditions that must be satisfied for a value that the object may represent, and may define values (e.g., integer values, floating point values, string length values, etc.) that are permitted to be associated with the object and/or that are not permitted to be associated with the object. Further, values that satisfy each constraint associated with an object may constitute positive test data, whereas values that violate one or more constraints associated with an object may constitute negative test data, in some implementations.

For example, the requirement "Password must be at least five characters long" represents a string length constraint. Character strings (e.g., a sequence of characters, digits, etc.) greater than or equal to five characters in length satisfy this string length constraint, and may constitute positive test data. Conversely, character strings less than five characters in length violate this string length constraint, and may constitute negative test data. String length constraints and other types of constraints are described in more detail elsewhere herein. Test data may include specific values (e.g., integer values, floating point values, character strings including string length values, etc.) that may satisfy or violate one or more constraints associated with an object, in some implementations. Test data and test data generation are described in more detail elsewhere herein.

As further shown in FIG. 4, process 400 may include obtaining text sections, of the text, for processing (block 420). For example, client device 210 may obtain the text, and may prepare the text for processing to extract constraints associated with an object in the text. In some implementations, client device 210 may determine text sections, of the text, to be processed. For example, client device 210 may determine a manner in which the text is to be partitioned into text sections, and may partition the text into the text sections. A text section may include, for example, a sentence, a line, a paragraph, a page, a document, etc. In some implementations, client device 210 may label each text section, and may use the labels when processing the text. Additionally, or alternatively, client device 210 may process each text section separately (e.g., serially or in parallel).

Client device 210 may prepare the text (e.g., one or more text sections) for processing, in some implementations. For example, client device 210 may standardize the text to prepare the text for processing. In some implementations, preparing the text for processing may include adjusting characters, such as by removing characters, replacing characters, adding characters, adjusting formatting, adjusting spacing, removing white space, or the like. For example, client device 210 may replace multiple spaces with a single space, may standardize brackets (e.g., various types of brackets are replaced with a particular type of bracket), may remove punctuation, or the like.

In some implementations, client device 210 may identify individual words in the text. For example, client device 210 may identify character strings that are separated by spaces. For example, client device 210 may process the text "The registration system shall allow users to enter personal information," and may identify the following individual words "The, registration, system, shall, allow, users, to, enter, personal, information." In some implementations, client device 210 may replace contractions with constituent words. For example, the word "can't" may be replaced with the words "can" and "not." Additionally, or alternatively, client device 210 may modify contractions by splitting contractions into two constituent parts. For example, "isn't" may be replaced with "is" and "n't."

As further shown in FIG. 4, process 400 may include associating tags with words in the text sections (block 430). For example, client device 210 may receive information that identifies one or more tags, and may associate the tags with words in the text based on tag association rules. The tag association rules may specify a manner in which the tags are to be associated with the words, based on characteristics of the words. For example, a tag association rule may specify that a singular noun tag ("/NN") is to be associated with words that are singular nouns (e.g., based on a language database, a context analysis, etc.). A word may refer to a unit of language that includes one or more characters. A word may include a dictionary word (e.g., "gas") or may include a non-dictionary string of characters (e.g., "asg"). Further, a word may include a digit (e.g., "8") or a sequence of digits (e.g., "88").

As an example, client device 210 may receive a list of part-of-speech tags (POS tags) and tag association rules for tagging words in the text with the POS tags based on the part-of-speech of the word. Example part-of-speech tags include CD (cardinal number), IN (preposition or subordinating conjunction), JJ (adjective), JJR (adjective, comparative), JJS (adjective, superlative), MD (modal), NN (noun, singular or mass), NNS (noun, plural), NNP (proper noun, singular), NNPS (proper noun, plural), VB (verb, base form), VBD (verb, past tense), VBG (verb, gerund or present participle), VBP (verb, non-third person singular present tense), VBZ (verb, third person singular present tense), VBN (verb, past participle), RB (adverb), RBR (adverb, comparative), RBS (adverb, superlative), etc.

In some implementations, client device 210 may further process the tagged text to associate additional or alternative tags with groups of words that meet certain criteria. For example, client device 210 may associate an object tag (e.g., "Object") with noun phrases (e.g., consecutive words with a noun tag, such as /NN, /NNS, /NNP, /NNPS, etc.). In some implementations, client device 210 may associate an object tag with a particular word based on a user input. In some implementations, client device 210 may only process words with particular tags, such as noun tags, cardinal number tags, object tags, verb tags, adjective tags, comparative tags, etc., when extracting constraints.

As further shown in FIG. 4, process 400 may include identifying numeric values and assigning values associated with the numeric values to variables (block 440). For example, client device 210 may identify a word including the POS tag "CD," and may determine that the word represents a numeric value. For example, client device 210 may identify the digit "9" (e.g., based on the POS Tag "CD"), and may determine that the digit "9" represents a numeric value. Additionally, or alternatively, client device 210 may identify the word "nine" as representing a number (e.g., based on the POS Tag "CD"), and may determine that the word "nine" represents a numeric value.

In some implementations, client device 210 may infer a numeric value. For example, assume that the text includes the requirement "Password must include an uppercase letter." Client device 210 may identify the word "an," and may infer a numeric value of one, for example. Further, assume that the text includes the requirement "Password must include lowercase characters." Client device 210 may infer a numeric value of at least two, for example. Additionally, or alternatively, client device 210 may infer a numeric value based on identifying a value associated with an object. For example, assume that the text includes the requirement "Loan amount must be less than net income." Client device 210 may infer a numeric value by identifying a value associated with an object (e.g., "net income"), in some implementations.

In some implementations, client device 210 may identify a particular unit (e.g., a unit of measure, quantity, degree, etc.) associated with a numeric value (and/or a variable). For example, client device 210 may identify a word (e.g., a string of characters) representing a unit (e.g., "kg," "m," "dollar," etc.), and may associate the unit with an identified numeric value. Client device 210 may determine values that are permitted to be associated with the object based on the unit, in some implementations. In this way, client device 210 may generate positive test data and/or negative test data based on identifying values associated with a particular unit, as described in more detail elsewhere herein.

In some implementations, client device 210 may assign a value (e.g., an integer value, a floating point value, etc.), associated with a numeric value, to a variable. For example, client device 210 may assign a value, associated with a numeric value in a text section, to a variable. In some implementations, if client device 210 identifies more than one numeric value in a text section, then client device 210 may assign the numeric values to variables in a particular order based on the location of the numeric values in the text section (e.g., may assign numeric values to variables in order from left to right, from top to bottom, or the like).

Client device 210 may generate equations based on one or more variables associated with one or more numeric values, for example. In this way, client device 210 may analyze the generated equations representing extracted constraints to generate positive test data and negative test data, as described in more detail elsewhere herein.

Client device 210 may use the tagged words and values associated with the numeric values to extract constraints associated with an object, as described in more detail elsewhere herein. In this way, client device 210 may identify values that are permitted to be and/or are not permitted to be associated with an object, and may generate positive test data and negative test data based on the identified values.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
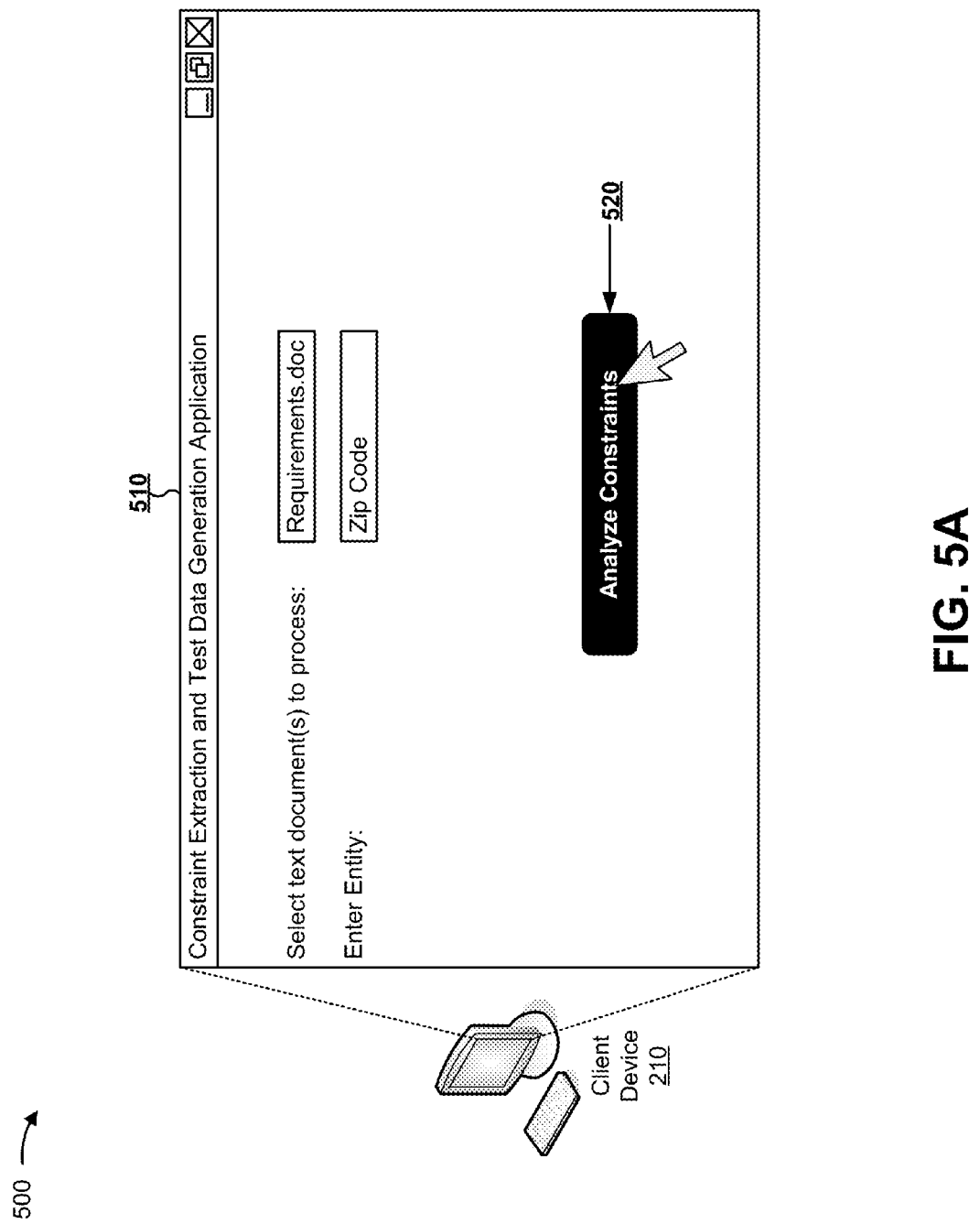
FIGS. 5A and 5B are diagrams of an example implementation relating to the example process shown in FIG. 4.
Figure 5B:
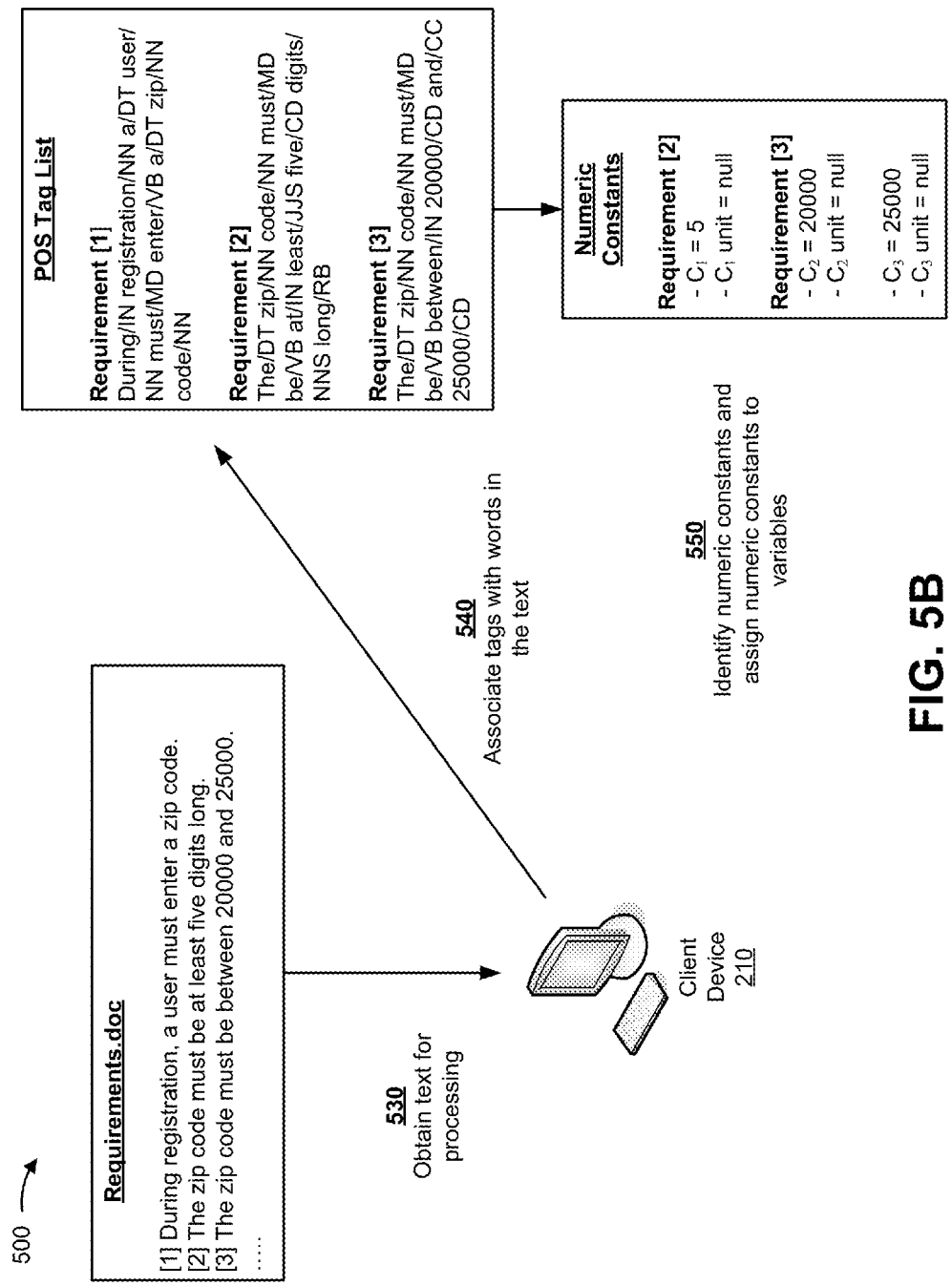

FIGS. 5A and 5B are diagrams of an example implementation 500 relating to example process 400 shown in FIG. 4. FIGS. 5A and 5B show an example of preparing text for processing to extract constraints associated with an object in the text for test data generation.

As shown in FIG. 5A, and by reference number 510, client device 210 provides (e.g., for display) a constraint extraction and test data generation application via which the user may specify text to be processed when extracting constraints associated with an object in the text. As shown, the user may provide input identifying text to process (e.g., one or more text documents, such as a document entitled "Requirements.doc"), and may provide input identifying the object to be used when extracting constraints and generating test data (e.g., shown as "Zip Code"). As shown by reference number 520, when the user has finished specifying text to be processed and identifying an object, the user may interact with an input mechanism (e.g., a button, a link, etc.) to cause client device 210 to extract constraints associated with the selected object and generate test data based on the extracted constraints.

As shown in FIG. 5B, client device 210 processes the text based on the user interaction. As shown by reference number 530, client device 210 obtains the text to be processed based on a text document identified by the user. As shown, assume that the text is a text document entitled "Requirements.doc," and that the text includes the following three requirements:

[1] During registration, a user must enter a zip code.
[2] The zip code must be at least five digits long.
[3] The zip code must be between 20000 and 25000.

As shown by reference number 540, client device 210 processes the text to associate tags with words in the text. As shown, client device 210 may tag a text section associated with requirement [1] as follows:

[1] During/IN registration/NN a/DT user/NN must/MD enter/VB a/DT zip/NN code/NN

The above tagged text section indicates that "During" is a preposition (IN); "registration," "user," "zip," and "code" are nouns (NN); "a" is a determiner (DT); "must" is a modal (MD); and "enter" is a verb (VB). Client device 210 may tag text sections associated with requirement [2] and requirement [3] in a similar manner, as shown.

As shown by reference number 550, client device 210 may process tagged text sections to identify numeric values, and may assign the numeric values to variables. As shown, assume that the client device 210 identifies the words "five," "20000," and "25000" as including the POS Tag "CD," indicating that these words are numeric values. Client device 210 may determine that the words "five," "20000," and "25000" represent numeric values, and may assign values (e.g., integer values) associated with the numeric values to variables, as shown. For example, client device 210 may assign an integer value of "5" to a variable "$C_1$," an integer value of "20000" to a variable "$C_2$," and an integer value of "25000" to a variable "$C_3$," as shown. Further, assume that the client device 210 determines that the values for $C_1$, $C_2$, and $C_3$ are not associated with a particular unit of measure. Based on this determination, client device 210 may assign unit values for each variable as "null."

Client device 210 may extract constraints associated with an object based on the tagged text sections and the identified numeric values, as described in more detail elsewhere herein. Based on the variables representing identified numeric values, client device 210 may generate and analyze equations representing extracted constraints to generate positive and negative test data, as described in more detail elsewhere herein.

As indicated above, FIGS. 5A and 5B are provided as an example. Other examples are possible and may differ from what was described with regard to FIGS. 5A and 5B.

Figure 6:
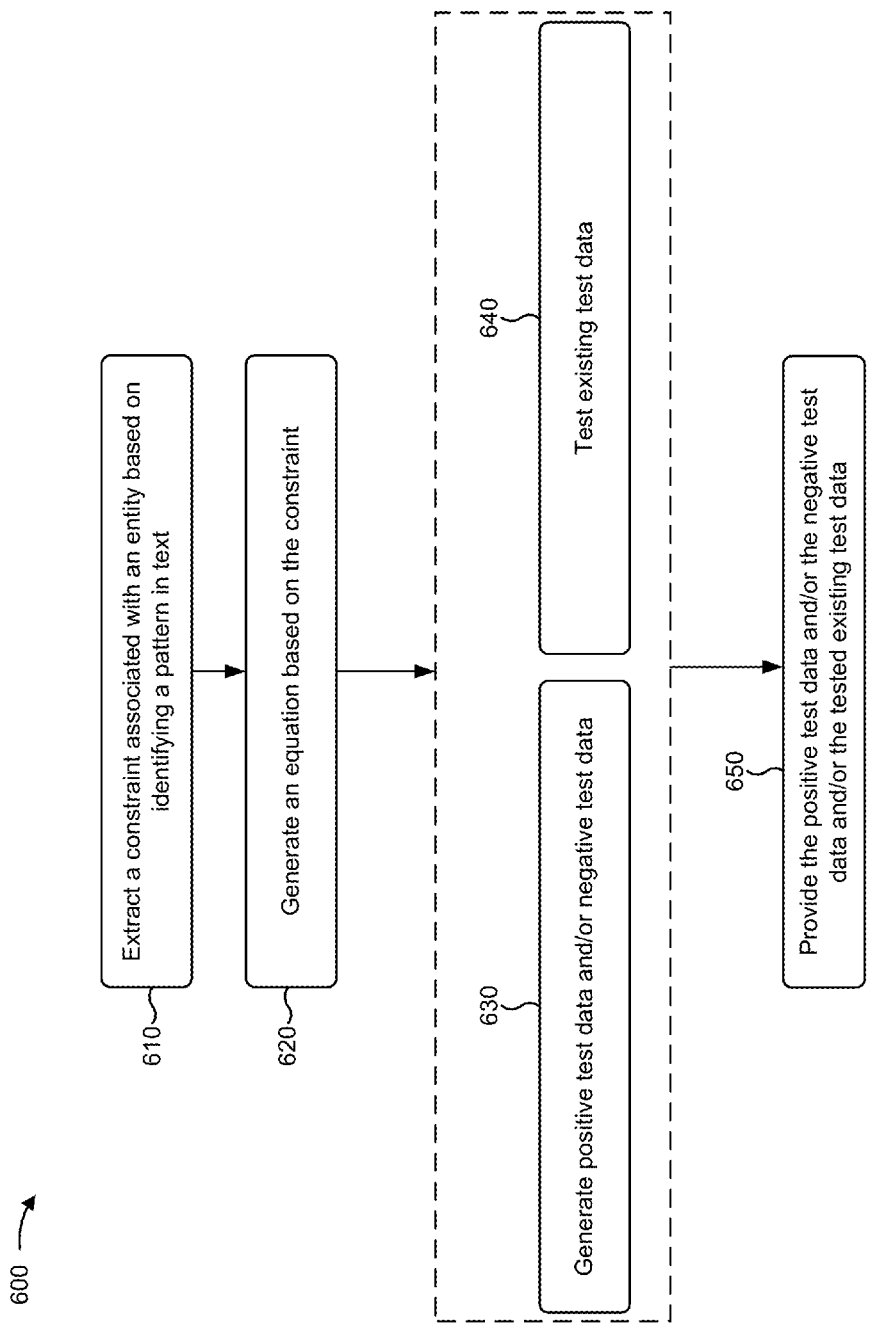
FIG. 6 is a flow chart of an example process for processing text to generate test data for an object in the text based on constraints extracted from the text.

FIG. 6 is a flow chart of an example process 600 for processing text to generate test data for an object in the text based on constraints extracted from the text. In some implementations, one or more process blocks of FIG. 6 may be performed by client device 210. In some implementations, one or more process blocks of FIG. 6 may be performed by another device or a group of devices separate from or including client device 210, such as server device 220.

As shown in FIG. 6, process 600 may include extracting a constraint associated with an object based on identifying a pattern in text (block 610). For example, client device 210 may identify a pattern in the text (e.g., in a text section), and may extract a constraint associated with an object based on identifying the pattern in the text. In some implementations, client device 210 may extract a constraint associated with an object in the text based on identifying a particular pattern (e.g., a particular sequence and/or combination of characters, words, etc. that appear in the text), such as by using a regular expression, a basic regular expression, an extended regular expression, or the like. In some implementations, client device 210 may extract one or more numeric constraints, one or more string length constraints, one or more string constituent constraints, one or more other constraints, or a combination thereof, from text, as described in more detail below.

In some implementations, client device 210 may extract a numeric constraint associated with an object in the text. In some implementations, a numeric constraint may define a condition between an object and a numeric value that, if satisfied, may result in positive test data, and if violated, may result in negative test data. For example, the text "Age must be greater than 30" includes the constraint that age values (e.g., integer values) must be greater than thirty (e.g., an integer value of 30). Positive test data may include particular values (e.g., integer values) that are greater than the numeric value (e.g., the integer value of 30), whereas negative test data may include particular values that are less than or equal to the numeric value.

In some implementations, a numeric constraint may define a condition between a first object and a second object. For example, the text "Net pay must be less than gross pay" includes a constraint between two objects (e.g., "Net pay" and "gross pay") indicating that a value associated with the first object (e.g., "Net pay") must be less than a value associated with the second object (e.g., "gross pay").

In some implementations, a numeric constraint may define a condition between a first object, one or more numeric values, and a second object. For example, the text "Initial deposit must be at least 10% of the total cost" includes a constraint between two objects (e.g., "initial deposit" and "total cost") indicating that an "initial deposit" value must be at least ten percent of a "total cost" value.

In some implementations, client device 210 may extract a numeric constraint associated with an object in the text using a regular expression. For example, client device 210 may extract a numeric constraint based on identifying the object, a relational operator, and a numeric value in a text section (e.g., a sentence). A relational operator may include a character, a digit, a word, a phrase, a symbol, etc. that defines a relationship between two or more values (e.g., object values, numeric values, etc.). For example, a relational operator may define a relationship between an object and a numeric value that may produce a constraint (e.g., between an object and a numeric value, between a first object and a second object, between a first object and a second object based on a numeric value, etc.).

Further, a relational operator may compare one or more values (e.g., an integer value associated with an object and an integer value associated with a numeric value), and a comparison of the one or more values may result in a Boolean value (e.g., 9>8=true), where "true" may be indicative of positive test data and "false" may be indicative of negative test data. In some implementations, client device 210 may receive input (e.g., from a user and/or another device) that identifies a set of relational operators.

Examples of relational operators may include, but are not limited to, greater, greater than, ">", greater than or equal to, ">=", lesser, less, less than, lesser than, "<", less than or equal to, "<=", equal to, "=", "==", is, equal, only, can shall, will would, should, would, has to must, same as, expected, not equal, "!=", different from, between, range, interval, lie, lies, in, within, inside, from, not "in range", lies out, lies outside, "!>", "!<", maximum, minimum, not, cannot, can't, no, not, "n't", not less, not more, exceed, excess, than, larger, larger than, smaller, smaller than, bigger, bigger than, earlier, earlier than, later, later than, wider, wider than, taller, taller than, deeper, deeper than, heavier, heavier than, lighter, lighter than, stronger, stronger than, weaker, weaker than, clearer, clearer than, longer, longer than, shorter, shorter than, higher, higher than, lower, lower than, faster, faster than, slower, slower than, warmer, warmer than, hotter, hotter than, colder, colder than, at least, at most, more, less, more than, no more than, no less than, before, prior, prior to, after, multiplied, multiplied by, multiple, multiple of, multiplication of, divide, divided by, fraction of, added to, sum of, addition of, subtracted from, minus, plus, times, increase, increment, decrease, decrement, total of, as many, as many as, as much, as much as, or the like.

For example, the text "Quantity must be at least 50" includes a numeric constraint associated with the object (e.g., "Quantity"). Client device 210 may extract the numeric constraint based on identifying the object, the numeric value (e.g. "50"), and the relational operators "must be" and "at least."

Additionally, or alternatively, client device 210 may extract a numeric constraint based on identifying the object, one or more numeric values, and/or a unit indicator in the text section. A unit indicator may include a set of characters, words, phrases, symbols, etc. that refers to a unit of measurement, value, degree, etc. Examples of unit indicators may include, but are not limited to, meter, "m", inch, "in", kilogram, "kg", pound, "lb", dollar, "USD", "$", hertz, "Hz", degrees, Celsius, watts, "W", miles per hour, "MPH", "psi", seconds, etc.

For example, the text "Weight must be greater than 50 kilograms" includes a numeric constraint associated with the object (e.g., "Weight"). Client device 210 may extract the numeric constraint based on identifying the object, the relational operators (e.g., "must be" and "greater than"), the numeric value (e.g., "50"), and the unit indicator (e.g., "kilograms"). In this way, client device 210 may associate a numeric value and/or the object with a particular unit, for example.

Additionally, or alternatively, client device 210 may extract a numeric constraint associated with an object in the text based on identifying the object, a relational operator, and a numeric value associated with a different object. For example, the text "Score must be lower than the baseline" includes a numeric constraint associated with the object (e.g., "Score"). Client device 210 may extract the numeric constraint based on identifying the object (e.g., "Score"), the relational operators (e.g., "must be" and "lower"), and a numeric value associated with the different object (e.g., "baseline").

As described above, client device 210 may extract a numeric constraint from a text section using a regular expression, for example. Based on identified matches between the regular expression and the text section, client device 210 may extract a constraint. For example, the following example pattern may be indicative of a numeric constraint:

Example Pattern for Numeric Constraints

Pattern (e1, [e2], [$1], $c1, [$c2], [Unit])

As shown above, the example pattern for numeric constraints may include one or more parameters (e.g., "e1", "[e2]", "$c1," etc.), that may be matched in a text section. The parameter "e1" may refer to an object. In some implementations, client device 210 may receive input (e.g., from a user of client device 210 or from another device) that identifies the parameter "e1" (e.g., the object). In some implementations, the parameter "[e2]" may refer to a different object that may be identified in the text section. In some implementations, the parameters "[$1]," "$c1," and "[$c2]" may refer to numeric values. Further, the parameter "[Unit]" may refer to a unit indicator (e.g., m, kg, USD, etc.), associated with one or more numeric values (e.g., "[$1], "$c1", "[$c2]", etc.).

In some implementations, client device 210 may extract a numeric constraint by identifying the parameter "e1," a relational operator, and the parameter "$c1." If client device 210 does not identify the parameter "e1" in a particular text section, then client device 210 may determine that the particular text section does not include a constraint associated with the object, for example (e.g., because the text section does not include the object). Further, if client device 210 identifies the parameter "e1" in the text section, but does not identify the parameter "c1," then client device 210 may determine that the text section does not include a numeric constraint associated with the object, for example (e.g., because the text section does not include a numeric value). In some implementations, parameters including brackets (e.g., "[ ]") in a regular expression indicate that the parameters may not need to be present in the text section for a constraint to be extracted. For example, client device 210 may extract a numeric constraint (or another constraint) from a text section despite a parameter including "[ ]" being absent from the text section. For example, a text section including the requirement "The quantity must be at least 800" may include a numeric constraint, despite the text section not including a unit indicator.

As an example, assume that a text section includes the requirement "To receive a loan, income must be at least 100,000 USD." Client device 210 may extract a numeric constraint from the text section by using a regular expression. For example, assume that client device 210 identifies the object "INCOME," the relational operators "must be" and "at least," the numeric value "100,000," and the unit indicator "USD." Based on identifying the foregoing parameters, client device 210 may extract a constraint associated with the object "Income." In some implementations, client device 210 may identify one or more relational operators in a text section, and may assign a preference to one of the operators. For example, client device 210 may identify the relational operators "must be" and "at least" in the same text section. The relational operator "must be" may define a relationship between, for example, an object and a numeric value that denotes equality, whereas the relational operator "at least" may denote that the object must be larger than the numeric value. In such a case, client device 210 may give preference to the relational operator "at least" when extracting the constraint.

In some implementations, if client device 210 identifies the relational operator "not" and another relational operator (e.g., less, more, etc.), then client device 210 may combine the relational operators when extracting a constraint associated with an object. For example, the relational operator "less" may denote that the object is to be less than a numeric value, whereas the relational operator "not less" may denote that the object is to be larger than the numeric value. Thus, in such cases, client device 210 may give preference to the relational operator "not less" when extracting a constraint associated with the object.

In some implementations, client device 210 may identify an object, a relational operator, a numeric value, etc. despite a grammatical error, an omission of a character, or the like. For example, client device 210 may determine whether a particular string of characters is within a threshold number of characters of matching an object, a relational operator, a numeric value, etc. For example, a text section may include the text "Password must not be less than 8 digits." Client device 210 may identify the object "password" and the relational operator "less," despite the grammatical errors in the text section, for example. In some implementations, the threshold number of characters may be one character, two characters, etc.

In some implementations, client device 210 may extract a numeric constraint based on a particular order of words in a text section. For example, client device 210 may extract a numeric constraint based on identifying an object, a relational operator, and a numeric value in a particular order (e.g., object—relational operator—numeric value). For example, client device 210 may extract a numeric constraint from text including the requirement "Quantity must be at least 2,000." Additionally, or alternatively, client device 210 may extract a numeric constraint based on identifying an object, a relational operator, and a numeric value in a text section, regardless of order. For example, client device 210 may extract a numeric constraint from text including the requirement "2,000 is the minimum acceptable quantity."

In some implementations, client device 210 may identify one or more words, phrases, etc. that modify the object. For example, assume that a text section includes "50% of the income . . . " Client device 210 may identify "50," "%," and "income," and may extract a constraint associated with the object "Income." Further, in some implementations, client device 210 may identify one or more numeric values in a text section. For example, the text section may include "Mass must be between 50 and 100 Kilograms." Client device 210 may identify the object "Mass," the relational operator "between," the numeric value "50," another numeric value "100," and the unit indicator "Kilograms." Further, client device 210 may extract a constraint associated with the object "mass" based on identifying the object, relational operator, numeric values, and a unit indicator.

In some implementations, client device 210 may extract a string length constraint associated with an object in the text. A string length constraint may define a condition regarding a number of required characters (e.g., a string length) for a string associated with an object. In some implementations, client device 210 may extract a string length constraint associated with an object in a text section using a regular expression. For example, client device 210 may extract a string length constraint associated with an object in the text based on identifying the object, a relational operator, a numeric value, and a length indicator in a text section (e.g., a sentence). A length indicator may include a set of characters, words, phrases, symbols, etc. that indicate length, in some implementations. Examples of length indicators may include, but are not limited to, length, in length, size, in size, size of, long, longer, longer than, short, shorter, shorter than, lie, lie between, or the like. In some implementations, client device 210 may receive input (e.g., from a user and/or another device) that identifies a set of length indicators.

For example, assume that a text section includes "Password must be at least 8 characters long." Client device 210 may extract a string length constraint from the text section using a regular expression. For example, client device 210 may identify the object "Password," the relational operator "at least," the numeric value "8," and the length indicator "long." Based on identifying the pattern using the regular expression, client device 210 may extract a string length constraint associated with the object "Password."

In some implementations, client device 210 may identify a size limit indicator associated with a string length constraint. A size limit indicator may include a particular numeric value associated with a maximum (or minimum) length of a string (e.g., producing a constraint on string length). For example, client device 210 may identify a pattern indicating a string length constraint (e.g., an object, a relational operator, and a length indicator), and may identify one or more numeric values. For example, assume that a text section includes "Key must be between three and eight characters in length." Client device 210 may identify the numeric values "three" and "eight," and may determine that "three" is a minimum size limit indicator and that "eight" is a maximum size limit indicator. In some implementations, client device 210 may not identify one or more size limit indicators in a text section when extracting a string length constraint. In such cases, client device 210 may determine that a minimum (or maximum) size limit on a string length is null, for example.

In some implementations, client device 210 may extract a string constituent constraint associated with an object. A string constituent constraint may define one or more conditions regarding a number of required string constituents that must be included in a string associated with an object (e.g., one or more characters or types of characters that must be included in a string associated with the object). For example, a string constituent may include a particular character or type of character (e.g., an uppercase character, a lowercase character, a special character, etc.), a set of characters (e.g., a set of alphanumeric characters), a digit, or the like.

In some implementations, client device 210 may extract a string constituent constraint associated with an object in a text section using a regular expression. For example, client device 210 may extract a string constituent constraint associated with an object in the text based on identifying the object, an inclusion indicator, a relational operator, a numeric value, and a string constituent indicator in a text section. Examples of string constituent indicators may include, but are not limited, to the following words: character, alphanumeric, uppercase, lowercase, digit, number, special, letter, etc.

An inclusion indicator may include, for example, a set of characters, words, phrases, symbols, etc., that is indicative of inclusion or exclusion. An inclusion indicator may define a relationship between an object and one or more string constituents, for example. Examples of inclusion indicators may include, but are not limited to, the following words: contain, comprise, include, contains, comprises, includes, containing, including, comprising, accepts, accept, accepting, combination of, has, having, have, incorporate, involve, encompass, consist, consist of, be made up of, be composed of, etc. An inclusion indicator may be indicative of exclusion by being associated with a negative modifier (e.g., "not").

For example, assume that the text includes the requirement "Password must include at least one uppercase character." Client device 210 may extract a string constituent constraint from the text section using a regular expression. For example, client device 210 may identify the object "Password," the relational operators "must" and "at least," the inclusion indicator "include," the numeric value "one," and the string constituent indicator "uppercase character." In some implementations, client device 210 may extract a string constituent constraint based on identifying a relational operator, a numeric value, and a string constituent indicator in a particular order (e.g., relational operator—numeric value—string constituent indicator).

In some implementations, client device 210 may extract a string constituent constraint including a particular string constituent. For example, assume that the text includes the requirement "Password must contain at least two of the following lowercase letters [g-t]." Client device 210 may identify the string constituent indicator (e.g., "lowercase letters") and the particular string constituents (e.g., "g-t"), and may extract a string constituent constraint.

In some implementations, client device 210 may extract a string constituent constraint including multiple string constituents from a text section. For example, client device 210 may identify one or more string constituent indicators, one or more numeric values, one or more relational operators, and one or more combination indicators. A combination indicator may include, for example, a set of characters, words, phrases, symbols, etc., that is indicative of combining, joining, including, excluding, or the like. Examples of combination indicators include, for example, "and," "or," "also," ",", or the like.

For example, a text section may include the requirement "Each client's record must be assigned a unique file name, which must be a combination of at least 3 uppercase letters, at least 4 special characters, and at most 5 digits." Client device 210 may identify the object "file name," the relational operator "must," and the inclusion indicator "combination of," for example. Further, client device 210 may identify a first relational operator "at least," a first numeric value "3," and a first string constituent indicator "uppercase letters," for example. Client device 210 may identify a second relational operator "at least," a second numeric value "4," and a second string constituent indicator "special characters," for example. Further, client device 210 may identify a third relational operator "at most," a third numeric value "5," and a third string constituent indicator "digits," for example. Client device 210 may identify combination indicators "," and "and," and may identify that the first string constituent, the second string constituent, and third string constituent are associated with the object "file name," for example.

Based on extracting one or more constraints associated with an object in a text section, client device 210 may analyze the one or more constraints to determine values that are permitted to be and/or are not permitted to be associated with the object. In this way, client device 210 may generate test data based on determining values that satisfy and/or do not satisfy the constraints associated with an object, as described below.

As further shown in FIG. 6, process 600 may include generating an equation based on the constraint (block 620). For example, client device 210 may generate an equation based on an extracted constraint. In some implementations, client device 210 may generate one or more equations based on extracted constraints associated with an object. Additionally, or alternatively, client device 210 may generate one or more equations based on one or more types of extracted constraints associated with an object (e.g., a numeric constraint, a string length constraint, and/or a string constituent constraint). In this way, client device 210 may determine values that satisfy and/or do not satisfy the constraints, and may generate positive test data and negative test data based on the values, as described below.

In some implementations, client device 210 may generate an equation based on an extracted numeric constraint. For example, client device 210 may generate an equation based on the identified object, relational operator, and numeric value. Client device 210 may represent the object as a variable (e.g., "X") capable of representing a particular value (e.g., an integer value, a floating point value, etc.). For example, an input to the variable representing the object may include a digit, a sequence of digits, or the like. In some implementations, client device 210 may identify values to be assigned (e.g., as inputs) to the variable representing the object (e.g., may generate the values, may receive the values from another device, may receive the values from a user of client device 210, or the like).

The identified relational operator may define a relationship between the variable (e.g., "X") representing the object and a variable (e.g., "C") including a value associated with an identified numeric value (e.g., X=C, X !=C, X>C, X<C, X>=C, X<=C, etc.). For example, based on the identified relational operator, client device 210 may generate an equation by defining a relationship between the variable representing the object and the variable including a value associated with the identified numeric value.

For example, assume the text section includes the requirement "Score must be at least 3000." Client device 210 may extract a numeric constraint associated with the object (e.g., "Score"), and may generate the following equation based on the numeric constraint:

$$X >= 3000$$

Based on the generated equation, client device 210 may determine values (e.g., integer values) that satisfy the numeric constraint, and may determine values that do not satisfy the constraint, as described in more detail below.

In some implementations, client device 210 may generate an equation based on an extracted string length constraint. For example, client device 210 may generate an equation based on the identified object, relational operator, numeric value, and length indicator. For example, client device 210 may represent the object as a variable capable of being assigned various inputs. For example, an input to the variable representing the object may include a character string. Client device 210 may represent a string length associated with an object as a variable (e.g., "X") capable of representing a particular value or a set of values (e.g., integer values). Based on an input to the variable representing the object, client device 210 may determine a value associated with the variable representing the string length (e.g., "X").

For example, assume the text section includes the requirement "Password must be more than three characters long and must be less than eight characters long." Client device 210 may extract a string length constraint associated with the object "Password," and may generate the following equation based on the extracted string length constraint:

$$3 < X < 8$$

Based on the generated equation, client device 210 may determine values (e.g., integer values) that satisfy the string length constraint, and may determine values that do not satisfy the string length constraint, as described in more detail below.

In some implementations, client device 210 may generate an equation based on an extracted string constituent constraint. For example, client device 210 may generate an equation based on the identified object, relational operator, numeric value, and string constituent indicator. Client device 210 may represent the object as a variable capable of being assigned various inputs. For example, an input to the variable representing an object may include a character string including one or more string constituents (e.g., characters, special characters, alphanumeric characters, digits, etc.). Further, client device 210 may represent the string constituent as a variable (e.g., "X") capable of representing a particular value or set of values (e.g., an integer value). Based on an input to the variable representing the object, client device 210 may determine a value associated with the variable representing the string constituent (e.g., "X").

For example, assume the text section includes the requirement "Password must include at least three uppercase characters." Client device 210 may extract a string constituent constraint associated with the object "Password," and may generate the following equation based on the extracted string constituent constraint:

$$X >= 3$$

Based on the generated equation, client device 210 may determine values (e.g., integer values) that satisfy the string constituent constraint, and may determine values that do not satisfy the string constituent constraint, as described in more detail below.

In some implementations, client device 210 may store the generated equation, one or more variables, etc. in a data structure, for example. The data structure may include the generated equation, a variable representing the object, a variable representing a string length associated with the object, a variable representing a quantity of string constituents in a character string associated with the object, a variable representing an identified numeric value, or the like. Client device 210 may identify values to be assigned as inputs to the variable representing and/or associated with the object. For example, client device 210 may identify a value to be assigned as an input to a variable representing and/or associated with an object based on the type of constraint (e.g., numeric constraint, string length constraint, and/or string constituent constraint). Client device 210 may identify values by generating the values, receiving the values from another device, receiving the values from a user of client device 210, or the like. In this way, client device 210 may generate positive and negative test data based on determining values that satisfy or do not satisfy a constraint, as described below.

As further shown in FIG. 6, process 600 may include generating positive test data and/or negative test data for the object (block 630). For example, client device 210 may generate positive test data based on values that satisfy a constraint (or each constraint) associated with an object, and may generate negative test data based on values that do not satisfy one or more constraints associated with an object. Client device 210 may apply the positive and/or negative test data to a system that is designed based on the text (e.g., a requirements document). Additionally, or alternatively, client device 210 may provide the test data (e.g., for display), and a user may use the test data to test the system.

In some implementations, client device 210 may determine values that may generate positive and negative test data. The following table shows examples of values that may generate positive test data, and examples of values that may generate negative test data, for different generated equations:

| Generated Equation | Positive Test Data | Negative Test Data |
|---|---|---|
| $X = C$ | $C$ | $C - 1, C + 1, C + R$ |
| $X \ne C$ | $C + 1, C - 1, C - R^1$ | $C$ |
| $X > C$ | $C + 1, C + R$ | $C, C - 1, C - R^1$ |
| $X < C$ | $C - 1, C - R^1$ | $C, C + 1, C + R$ |
| $X >= C$ | $C, C + 1, C + R$ | $C - 1, C - R^1$ |
| $X <= C$ | $C, C - 1, C - R^1$ | $C + 1, C + R$ |
| $C_1 < X < C_2$ | $C_1 + 1, C_2 - 1, (C_1 + C_2)/2$ | $C_1, C_2, C_1 - 1, C_2 + 2$ |
| $C_1 <= X < C_2$ | $C_1, C_1 + 1, C_2 - 1, (C_1 + C_2)/2$ | $C_2, C_1 - 1, C_2 + 2$ |
| $C_1 < X <= C_2$ | $C_1 + 1, C_2, C_2 - 1, (C_1 + C_2)/2$ | $C_1, C_1 - 1, C_2 + 2$ |
| $C_1 <= X <= C_2$ | $C_1, C_1 + 1, C_2, C_2 - 1, (C_1 + C_2)/2$ | $C_1 - 1, C_2 + 2$ |

For example, as shown above, a generated equation may represent an extracted constraint (e.g., a numeric constraint, a string length constraint, and/or a string constituent constraint). Based on the extracted constraint, the variable "X" may include an integer value, representing a numeric value, a total length of a character string, and/or a quantity of particular characters in a string. For example, for a numeric constraint, "X" may represent an integer value associated with an object. For a string length constraint, "X" may represent a length of a string (e.g., a total quantity of characters in a string) associated with an object, for example. Further, for a string constituent constraint, "X"

may represent a quantity of particular characters in a string associated with an object, for example.

The values "C, $C_1$, and $C_2$" may represent variables associated with numeric values that were assigned by client device 210 (e.g., numeric values identified in a text section). The value "R" may represent a random value associated with integer values greater than one, for example. Further, the value "$R^1$" may represent a random value associated with integer values between zero and "C-1." Based on a generated equation, client device 210 may determine values that may or may not be associated with an object, and may generate positive and negative test data based on determining such values.

Client device 210 may generate positive and negative test data for a numeric constraint based on a generated equation, in some implementations. For example, client device 210 may generate positive test data and negative test data by generating integer values that satisfy and do not satisfy a constraint. For example, assume the text section includes the requirement "Quantity must be greater than 24000." Client device 210 may extract a constraint, and generate an equation "X>24000," for example. Based on the generated equation, client device 210 may determine values that satisfy the constraint and values that violate the constraint. For example, and as shown in the above chart, client device 210 may determine values that satisfy the constraint (e.g., 24001, 24015, etc.), and may provide the values as positive test data (e.g., via a display of client device 210). Further, client device 210 may determine values that do not satisfy the constraint (e.g., 24000, 23999, 22500, etc.) and may provide the values as negative test data, for example.

In some implementations, client device 210 may extract multiple numeric constraints from a text section. If client device 210 extracts multiple numeric constraints associated with the relational operator "=" (e.g., X=C, X=$C_1$, X=$C_2$, etc.), then client device 210 may provide an indication (e.g., via a display of client device 210) that the text section includes conflicting constraints, and/or that positive test data and negative test data may not be generated, for example. If client device 210 extracts multiple numeric constraints associated with the relational operator "!=" (e.g., X!=C, X!=$C_1$, X!=$C_2$, etc.), then client device 210 may generate positive test data based on determining values that satisfy each constraint (e.g., integer values where X does not equal C, $C_1$, or $C_2$). Further, client device 210 may generate negative test data based on determining values that do not satisfy the one or more constraints (e.g., integer values where X equals C, $C_1$, or $C_2$).

In some implementations, client device 210 may extract multiple numeric constraints associated with the relational operator "<" (e.g., X<C, X<$C_1$, X<$C_2$, etc.). In such cases, client device 210 may determine a minimum of C, $C_1$, and $C_2$, and may generate positive test data based on determining values that are less than the minimum of C, $C_1$, and $C_2$, for example. Further, client device 210 may generate negative test data based on determining values that are greater than, or equal to, the minimum of C, $C_1$, and $C_2$.

In some implementations, client device 210 may extract multiple numeric constraints associated with the relational operator ">" (e.g., X>C, X>$C_1$, X>$C_2$, etc.). Client device 210 may determine a maximum of C, $C_1$, and $C_2$, and may generate positive test data based on determining values that are greater than the maximum of C, $C_1$, and $C_2$, for example. Further, client device 210 may generate negative test data based on determining values that are less than, or equal to, the maximum of C, $C_1$, and $C_2$.

In some implementations, client device 210 may extract multiple numeric constraints associated with the relational operator "=<" (e.g., X=<C, X=<$C_1$, X=<$C_2$, etc.). Client device 210 may determine a minimum of C, $C_1$, and $C_2$, and may generate positive test data based on determining values that are less than, or equal to, the minimum of C, $C_1$, and $C_2$, for example. Further, client device 210 may generate negative test data based on determining values that are greater than the minimum of C, $C_1$, and $C_2$.

In some implementations, client device 210 may extract multiple numeric constraints associated with the relational operator ">=" (e.g., X>=C, X>=$C_1$, X>=$C_2$, etc.). Client device 210 may determine a maximum of C, $C_1$, and $C_2$, and may generate positive test data based on determining values that are greater than, or equal to, the maximum of C, $C_1$, and $C_2$, for example. Further, client device 210 may generate negative test data based on determining values that are less than the maximum of C, $C_1$, and $C_2$.

In some implementations, client device 210 may extract multiple numeric constraints associated with multiple relational operators (e.g., <, =<, >, =, etc.). For example, client device 210 may extract multiple numeric constraints and may generate multiple equations based on the constraints (e.g., X<$C_1$, X<$C_2$, X<$C_3$, X>$C_4$, X>$C_5$, etc.). Client device 210 may determine a minimum of $C_1$, $C_2$, and $C_3$, and may determine a maximum of $C_4$ and $C_5$, for example. If the minimum of $C_1$, $C_2$, and $C_3$ is greater than the maximum of $C_4$ and $C_5$, then client device 210 may generate positive test data by determining values that are between the minimum of $C_1$, $C_2$, and $C_3$ and the maximum of $C_4$ and $C_5$. If the minimum of $C_1$, $C_2$, and $C_3$ is less than the maximum of $C_4$ and $C_5$, then client device 210 may provide an indication (e.g., via a display of client device 210) that the text section includes conflicting constraints, and/or that positive and negative test data may not be generated, for example.

In some implementations, if client device 210 identified and/or associated a unit indicator with the identified numeric value, then client device 210 may associate the unit indicator with the positive test data. For example, assume that the text included "Weight must be less than 50 kg," and further assume that client device 210 identified a unit indicator (e.g., "kg"). When generating positive test data, client device 210 may associate the positive test data with the identified unit indicator (e.g., "kg"). Further, client device 210 may associate negative test data with a different unit indicator than the identified unit indicator (e.g., "lb"), and/or may not associate the negative test data with a unit indicator (e.g., "Null").

In some implementations, client device 210 may generate positive test data and negative test data for a string length constraint, in a similar manner as described above in connection with numeric constraints. For example, for a string length constraint (e.g., X>C, where "X" equals a total quantity of characters in a string), client device 210 may generate character strings having string lengths greater than "C" characters in length, and may provide the character strings as positive test data. Further, client device 210 may generate character strings having string lengths less than, or equal to, "C" characters in length, and may provide the character strings as negative test data, for example.

Further, client device 210 may generate positive and negative test data for a string constituent constraint, in a similar manner as described above in connection with numeric constraints. For example, for a string constituent constraint (e.g., X>C, where "X" represents a quantity of a particular string constituent in a character string), client device 210 may generate character strings including more than "C" of the particular string constituent, and may provide the character strings as positive test data. Further, client device 210 may generate character strings including less than, or equal to, "C" of the particular string constituent, and may provide the character strings as negative test data, for example.

In some implementations, client device 210 may extract interrelated string constituent and/or string length constraints associated with an object, and may generate positive and negative test data based on the interrelated constraints. For example, client device 210 may extract multiple string constituent constraints (e.g., n string constituent constraints) from a text section, and may extract a string length constraint.

Client device 210 may determine positive test data based on satisfying each constraint. For example, client device 210 may determine string lengths (e.g., "$L_1$," "$L_2$," ... "$L_n$") that satisfy the string length constraint. For each string constituent constraint, client device 210 may generate a character string (e.g., "$S_1$," "$S_2$," ... "$S_n$") including a quantity of particular characters such that the respective string constituent constraint is satisfied. Further, client device 210, when generating the respective character strings (e.g., "$S_{1-n}$"), may determine respective string lengths for each string (e.g., "$S_1$," "$S_2$," ... "$S_n$") such that the following equation is satisfied:

$$S_1 + S_2 + \ldots + S_n = L_1$$

Client device 210 may combine the character strings (e.g., $S_{1-n}$) to generate positive test data (e.g., a character string that satisfies the length constraint, and satisfies each respective string constituent constraint, respectively). Client device 210 may repeat the above process for various string lengths (e.g., $L_{1-n}$), and may generate additional positive test data, in some implementations.

In some implementations, client device 210 may generate negative test data based on violating one, some, or all constraints associated with an object. For example, client device 210 may extract multiple string constituent constraints (e.g., n string constituent constraints) from a text section, and may extract a string length constraint. For example, client device 210 may determine string lengths (e.g., "$L_{-1}$," "$L_{-2}$," ... "$L_{-n}$") that violate the string length constraint. Further, client device 210 may determine string lengths (e.g., "$L_1$," "$L_2$," ... "$L_n$") that satisfy the string length constraint, for example.

In some implementations, client device 210 may generate negative test data by generating character strings that satisfy each string constituent constraint, but violate the string length constraint. For each string constituent constraint, client device 210 may generate a character string (e.g., "$S_1$," "$S_2$," ... "$S_n$") including a quantity of particular characters such that the respective string constituent constraint is satisfied. Further, client device 210, when generating the respective character strings (e.g., "$S_{1-n}$"), may determine respective string lengths (e.g., "$S_1$," "$S_2$," ... "$S_n$") such that the following equation is satisfied:

$$S_1 + S_2 + \ldots + S_n = L_{-1}$$

Client device 210 may combine the character strings (e.g., $S_{1-n}$) to generate negative test data (e.g., a character string that violates the length constraint, but satisfies each respective string constituent constraint, respectively). Client device 210 may repeat the above process for various string lengths (e.g., $L_{1-n}$), and may generate additional negative test data, in some implementations.

In some implementations, client device 210 may generate negative test data by generating strings that satisfy the string length constraint, and satisfy some, but not all, of the string constituent constraints. For example, for each string constituent constraint except one, client device 210 may generate a character string (e.g., "$S_1$," "$S_2$," ... "$S_{n-1}$") including a quantity of particular characters such that the respective string constituent constraint is satisfied. Further, client device 210 may generate a character string (e.g., "$S_n$") that violates a string constituent constraint. Further, client device 210, when generating the respective character strings (e.g., "$S_{1-n}$"), may determine respective string lengths such that the following equation is satisfied:

$$S_1 + S_2 + \ldots + S_n = L_1$$

Client device 210 may combine the character strings (e.g., $S_{1-n}$) to generate negative test data (e.g., a character string that satisfies the length constraint, and satisfies each respective string constituent constraint except one). Client device 210 may repeat the above process, and iteratively generate character strings that violate additional string constituent constraints and/or the length constraint. In this way, client device 210 may generate negative test data that violates one, some, or all of the constraints associated with an object.

As further shown in FIG. 6, process 600 may include testing existing test data (block 640). For example, client device 210 may receive the existing test data based on input received from a user of client device 210 and/or from another device. In some implementations, a user may input information identifying the existing test data or a memory location at which the existing test data is stored. Based on the user input, client device 210 may retrieve the existing test data. The existing test data may include one or more character strings that were generated to test a system that was designed based on the requirements document, for example. Further, the requirements document may include the text sections that client device 210 used to extract one or more constraints associated with an object.

Client device 210 may determine whether the existing test data satisfies one or more constraints associated with an object (e.g., the constraint or constraints that client device 210 extracted from the text sections). For example, client device 210 may apply each portion of the existing test data as an input to the variable associated with the generated equation (e.g., the equation stored in the data structure), and may determine whether the existing test data satisfies or violates the extracted constraint (or constraints). For example, for an object associated with a numeric constraint, client device 210 may receive existing test data (e.g., integer values), and may determine whether the existing test data satisfies the extracted numeric constraint (or constraints) associated with the object. For an object associated with a string length constraint and/or a string constituent constraint (or constraints), client device 210 may receive existing test data (e.g., character strings), and may determine whether the lengths of the character strings satisfy or violate the extracted string length constraint. Further, client device 210 may determine whether the existing test data satisfies some, none, or all of the extracted string constituent constraints.

In some implementations, client device 210 may validate existing test data. For example, client device 210 may receive existing test data having a type classification (e.g., positive or negative). Client device 210 may test the existing test data and determine whether the existing test data constitutes positive test data or negative test data, for example. Client device 210 may compare the tested existing test data with the type classification, and may validate the existing test data based on the tested existing test data matching the type classification. In this way, client device 210 may validate existing test data, which may lead to more accurate software development, etc.

As further shown in FIG. 6, process 600 may include providing the positive test data and/or the negative test data and/or the tested existing test data (block 650). For example, client device 210 may provide (e.g., for display on a user interface) the generated positive test data and/or negative test data and/or the tested existing test data. Further, client device 210 may provide information associated with the test data, in some implementations. For example, client device 210 may provide an indication regarding the particular constraints that the test data satisfied and/or the particular constraints that the test data violated. Further, client device 210 may provide an indication regarding whether the test data constitutes positive test data or negative test data. Additionally, or alternatively, client device 210 may provide the test data to another device.

In this way, client device 210 may extract one or more constraints associated with an object in the text, and may generate positive test data and negative test data based on the extracted constraints. A user (e.g., a software engineer) of client device 210 may test a system using the positive test data and the negative test data. Further, a user of client device 210 may test existing test data, and may validate the existing test data. The generated test data and the validated existing test data may result in more accurate software development, etc. Further, implementations described herein may reduce the processing time and processing resources needed during software development and/or implementation.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
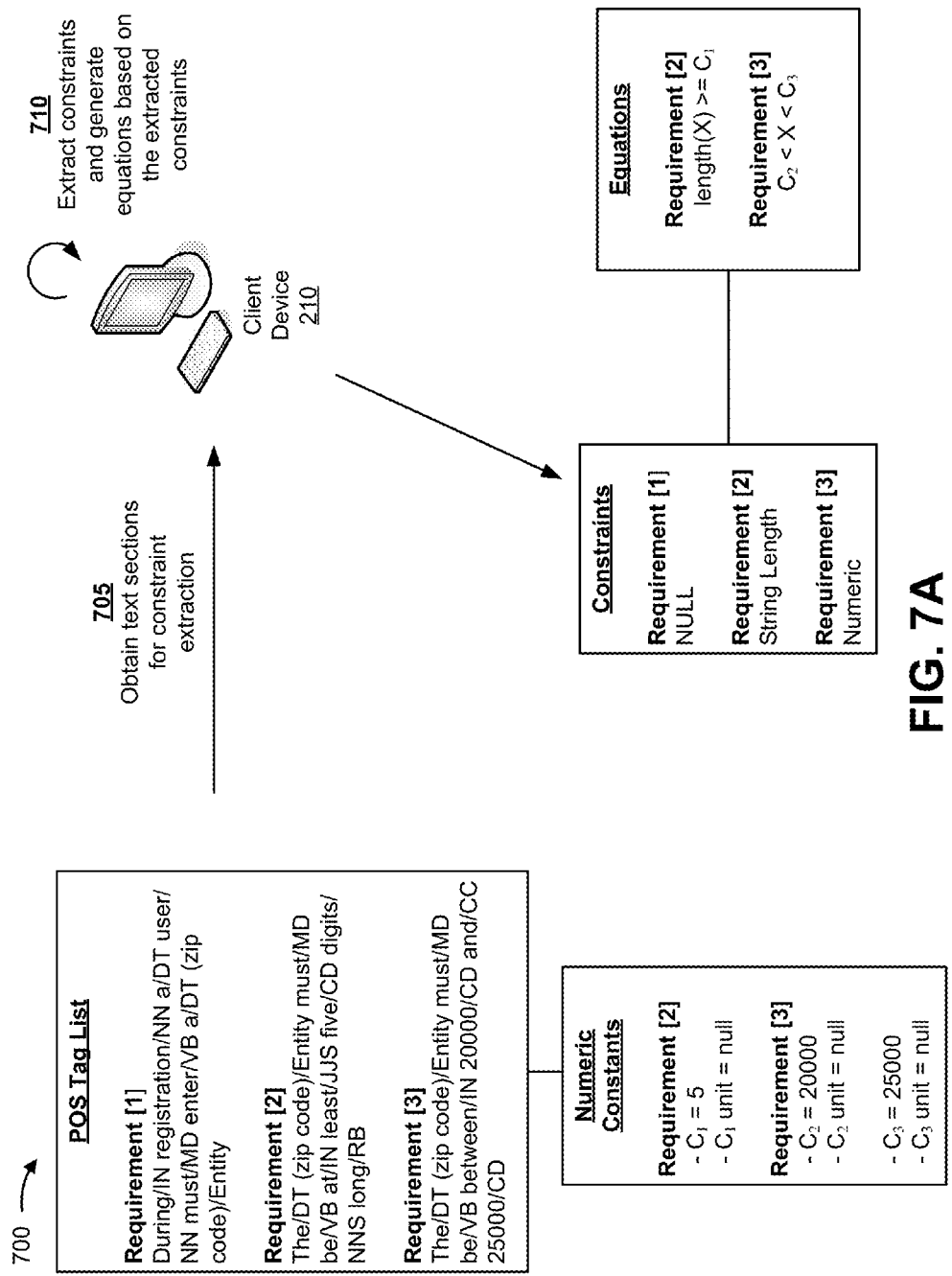
Figure 7B:
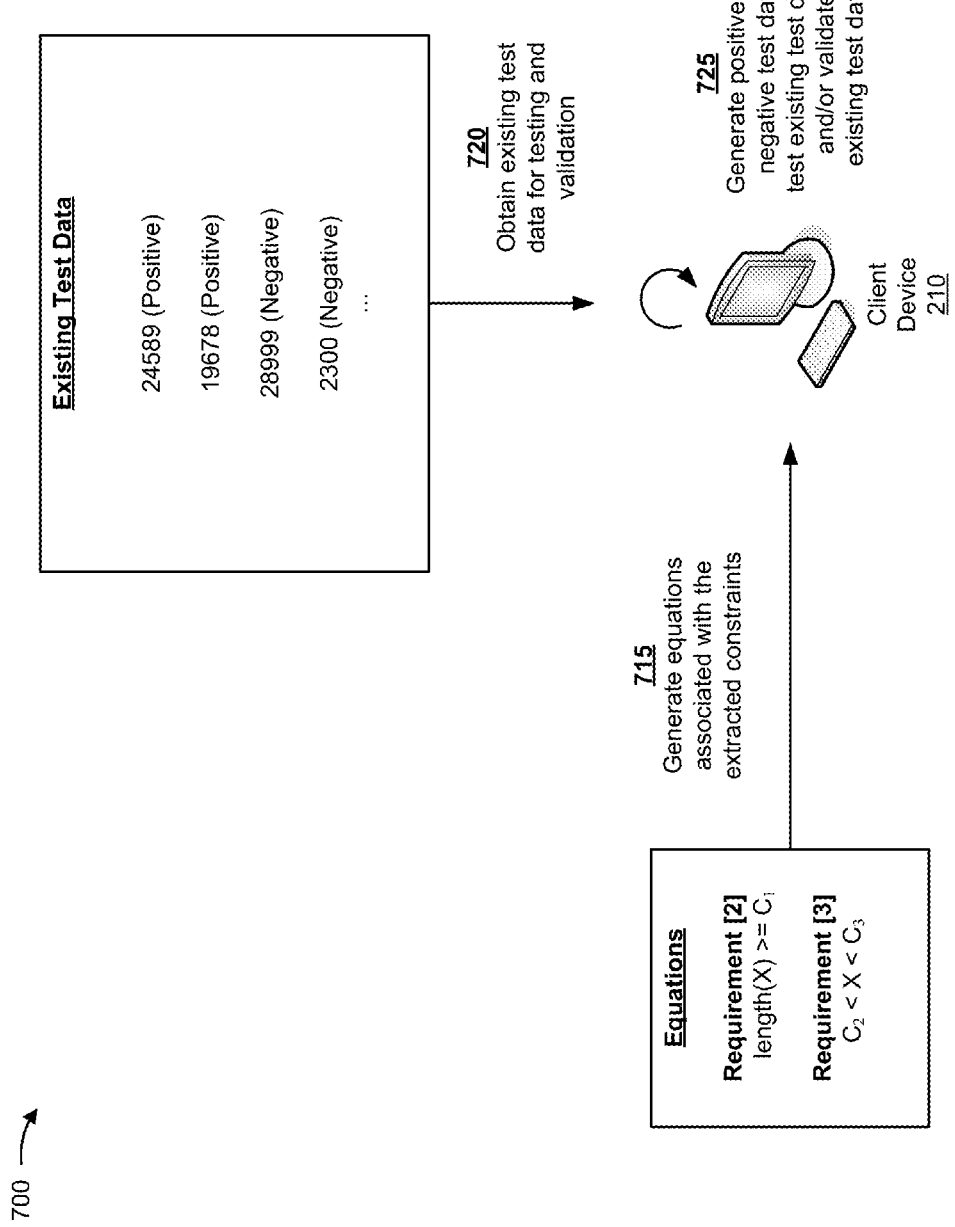

FIGS. 7A-7C are diagrams of an example implementation 700 relating to example process 600 shown in FIG. 6. FIGS. 7A-7C show an example of processing text to generate test data for an object in the text based on constraints extracted from the text. For the purpose of FIGS. 7A-7C, assume that the operations described herein in connection with FIGS. 5A and 5B have been performed.

As shown in FIG. 7A, and by reference number 705, client device 210 obtains text sections including the object and identified numeric values for constraint extraction. As shown by reference number 710, client device 210 extracts constraints associated with the object in the text and generates equations based on the extracted constraints. As shown, client device 210 extracts a string length constraint associated with the text section "Requirement [2]," extracts a numeric constraint associated with the text section "Requirement [3]," and determines that the text section "Requirement [1]" does not contain a constraint. As further shown, client device 210 generates an equation "length(X)>=$C_1$" based on the extracted string length constraint, and generates an equation "$C_2<X<C_3$" based on the extracted numeric constraint.

As shown in FIG. 7B, and by reference number 715, client device 210 generates the equations associated with the extracted constraints for test data generation and/or validation. As shown by reference number 720, client device 210 may receive existing test data for validation. For example, as shown, assume that the existing test data includes numeric strings of various digit lengths. Further, as shown, the existing test data may have been classified as either positive or negative. As shown by reference number 725, client device 210 generates positive test data and negative test data, and tests the existing test data. Further, client device 210 may validate the tested existing test data by comparing a received classification (e.g., positive or negative) with a result of the test.

As shown in FIG. 7C, client device 210 outputs the generated positive and negative test data, and outputs the tested existing test data. As shown, a user interface of client device 210 may provide the test data (e.g., particular strings of digits), may provide a "test data type" indicating whether the particular test data is positive or negative, and may provide comments regarding the particular constraints that the test data may have violated. As shown, for the tested existing test data, client device 210 may provide an indication of whether the tested existing test data is validated. In this way, client device 210 may provide the generated test data, the tested existing test data, and/or the validated test data to a user for use in testing a system.

As indicated above, FIGS. 7A-7C are provided merely as an example. Other examples are possible and may differ from what was described with regard to FIGS. 7A-7C.

Implementations described herein may assist a user in extracting constraints from natural language text, and generating test data based on the extracted constraints. Further, implementations described herein may allow a user to test existing data. In this way, a user may utilize the generated test data and/or validated existing data during a software development design phase, which may result in more accurate software development, etc. Further, implementations herein may reduce software errors and/or flaws, which may reduce processing time and processing resources needed during software development and/or during implementation.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   a memory; and
   one or more processors to:
      obtain text to be processed to extract one or more constraints corresponding to an object in the text,
         the one or more constraints defining values permitted to be associated with the object;
      associate part-of-speech tags with words in the text to improve constraint extraction and data generation;
      extract the one or more constraints based on associating the part-of-speech tags with the words and identifying one or more patterns in the text,
         the one or more patterns including a relational operator and a numeric value;
      generate one or more equations based on the one or more constraints;
      generate, based on the one or more constraints, positive test data and negative test data for testing values for the object,
         the positive test data including a first value that satisfies each of the one or more constraints based on the one or more equations, and
         the negative test data including a second value that violates at least one of the one or more constraints based on the one or more equations;
      receive existing test data from a memory location;
      apply the positive test data, the negative test data, and the existing test data to a system that is designed based on the text to at least one of:
         improve software accuracy,
         reduce security issues, or
         conserve processing resources;
      validate a classification of the existing test data as having a positive classification or a negative classification; and
      provide, for display on a user interface and based on applying the positive test data, the negative test data, and the existing test data, information that identifies:
         a first particular constraint that the positive test data satisfies,
         a second particular constraint that the negative test data violates, and
         the validation of the classification of the existing test data.

2. The device of claim 1, where the one or more processors are further to:
   determine whether the existing test data satisfies the one or more constraints; and
   where the one or more processors, when providing the information, are to:
      provide information that indicates whether the existing test data satisfies the one or more constraints.

3. The device of claim 1, where the one or more processors are further to:
   identify a length indicator in the text; and
   where the one or more processors, when extracting the one or more constraints, are to:
      extract a string length constraint based on identifying the length indicator in the text,
         the string length constraint defining string length values permitted to be associated with the object based on the numeric value and the relational operator.

4. The device of claim 3, where the one or more processors, when generating the one or more equations, are to:
   generate the one or more equations based on the string length constraint.

5. The device of claim 1, where the one or more processors are further to:
   identify a string constituent indicator in the text; and
   where the one or more processors, when extracting the one or more constraints, are to:
      extract a string constituent constraint based on identifying the string constituent indicator in the text,
         the string constituent constraint defining string constituent values permitted to be associated with the object based on the numeric value and the relational operator.

6. The device of claim 1, where the one or more constraints include at least one of:
   a numeric constraint that defines numeric values permitted to be associated with the object;
   a string length constraint that defines string length values permitted to be associated with the object; or
   a string constituent constraint that defines string constituent values permitted to be associated with the object.

7. The device of claim 1, where the one or more processors are further to:
   partition the text into text sections; and
   process each text section of the text sections separately.

8. A non-transitory computer-readable medium storing instructions, the instructions comprising:
   one or more instructions that, when executed by one or more processors, cause the one or more processors to:
      obtain text to be processed to extract a constraint corresponding to an object in the text,
         the constraint defining one or more values permitted to be associated with the object;

associate part-of-speech tags with words in the text for improving extraction of the constraint;
extract the constraint based on associating the part-of-speech tags with the words and identifying a pattern in the text,
generate one or more equations based on the constraint;
generate, based on the constraint, positive test data and negative test data for testing values for the object,
the positive test data including a first value that satisfies the constraint based on the one or more equations, and
the negative test data including a second value that violates the constraint based on the one or more equations;
receive existing test data from a memory location;
apply the positive test data, the negative test data, and the existing test data to a system that is designed based on the text for at least one of:
improving software accuracy,
reducing security issues, or
conserving processing resources;
validate a classification of the existing test data as having a positive classification or a negative classification; and
provide, for display on a user interface and based on applying the positive test data, the negative test data, and the existing test data, information that identifies:
a first particular constraint that the positive test data satisfies,
a second particular constraint that the negative test data violates, and
the validation of the classification of the existing test data.

9. The non-transitory computer-readable medium of claim 8, where the one or more instructions, when executed by the one or more processors, further cause the one or more processors to:
determine whether the existing test data satisfies the constraint; and
where the one or more instructions, that cause the one or more processors to provide the information, cause the one or more processors to:
provide information that indicates whether the existing test data satisfies the constraint.

10. The non-transitory computer-readable medium of claim 8, where the one or more instructions, when executed by the one or more processors, further cause the one or more processors to:
identify a numeric value in the text,
the numeric value being associated with another object in the text; and
where the one or more instructions, that cause the one or more processors to extract the constraint, cause the one or more processors to:
extract a numeric constraint based on identifying the numeric value in the text,
the numeric constraint defining numeric values permitted to be associated with the object based on the numeric value.

11. The non-transitory computer-readable medium of claim 8, where the one or more instructions, when executed by the one or more processors, further cause the one or more processors to:
identify a length indicator in the text; and
where the one or more instructions, that cause the one or more processors to extract the constraint, cause the one or more processors to:
extract a string length constraint based on identifying the length indicator in the text,
the string length constraint defining string length values permitted to be associated with the object.

12. The non-transitory computer-readable medium of claim 8, where the one or more instructions, when executed by the one or more processors, further cause the one or more processors to:
identify a string constituent indicator in the text; and
where the one or more instructions, that cause the one or more processors to extract the constraint, cause the one or more processors to:
extract a string constituent constraint based on identifying the string constituent indicator in the text,
the string constituent constraint defining string constituent values permitted to be associated with the object.

13. The non-transitory computer-readable medium of claim 12, where the one or more instructions, that cause the one or more processors to generate the one or more equations, cause the one or more processors to:
generate the one or more equations based on the string constituent constraint.

14. The non-transitory computer-readable medium of claim 8, where the one or more instructions, that cause the one or more processors to extract the constraint based on identifying the pattern in the text, cause the one or more processors to:
extract the constraint based on inferring a numeric value in the text.

15. A method, comprising:
obtaining, by a device, text to be processed to extract one or more constraints corresponding to an object in the text,
the one or more constraints defining values permitted to be associated with the object;
associating, by the device, part-of-speech tags with words in the text;
extracting, by the device, the one or more constraints based on associating the part-of-speech tags with the words and identifying one or more patterns in the text,
generating, by the device, one or more equations based on the one or more constraints;
generating, by the device and based on the one or more constraints, positive test data and negative test data for testing values for the object,
the positive test data including a first value that satisfies each of the one or more constraints based on the one or more equations, and
the negative test data including a second value that violates at least one of the one or more constraints based on the one or more equations;
receiving, by the device, existing test data from a memory location;
applying, by the device, the positive test data, the negative test data, and the existing test data to a system that is designed based on the text for at least one of:
improving software accuracy,
reducing security issues, or
conserving processing resources;
validating, by the device, a classification of the existing test data as having a positive classification or a negative classification; and
providing, by the device, for display on a user interface and based on applying the positive test data, the negative test data, and the existing test data, information that identifies:

a first particular constraint that the positive test data satisfies, a second particular constraint that the negative test data violates, and the validation of the classification of the existing test data.

16. The method of claim 15, further comprising:

determining whether the existing test data satisfies the one or more constraints; and where providing the information comprises:

providing information that indicates whether the existing test data satisfies the one or more constraints.

17. The method of claim 16, further comprising:

receiving the classification of the existing test data; and comparing the classification of the existing test data with the information that indicates whether the existing test data satisfies the one or more constraints; and where validating the classification of the existing test data as having the positive classification or the negative classification comprises:

validating the classification of the existing test data as having the positive classification or the negative classification based on comparing the classification of the existing test data with the information that indicates whether the existing test data satisfies the one or more constraints.

18. The method of claim 15, further comprising:

identifying a relational operator in the text; and where extracting the one or more constraints comprises:

extracting the one or more constraints based on identifying the relational operator.

19. The method of claim 15, further comprising:

identifying a unit indicator in the text; and where extracting the one or more constraints comprises:

extracting the one or more constraints based on identifying the unit indicator.

20. The method of claim 15, where extracting the one or more constraints comprises:

extracting the one or more constraints based on inferring a numeric value in the text.

* * * * *